United States Patent Office 3,386,984
Patented June 4, 1968

3,386,984
PROCESS FOR THE PRODUCTION OF HYDROCARBON-SOLUBLE MIXED CATALYSTS FOR THE POLYMERIZATION OF BUTA-1,3-DIENE
Nikolaus Schon and Gottfried Pampus, Leverkusen, and Josef Witte, Cologne-Stammheim, Germany, assignors to Farbenfabriken Bayer Aktiengesellschaft, Leverkusen, Germany, a corporation of Germany
No Drawing. Filed July 9, 1965, Ser. No. 470,932
Claims priority, application Germany, Oct. 1, 1964, F 44,113
18 Claims. (Cl. 260—94.3)

ABSTRACT OF THE DISCLOSURE

Catalyst based on aluminum alkyls reacted with the reaction products of titanium tetraiodide and a 1,2-epoxide to produce polymers of high cis-1,4-bond content.

The invention relates to a process for the production of catalysts which contain titanium-iodine compounds and which have improved catalytic efficacy, these catalysts being suitable for the polymerization of butadiene to polymers with a high content of cis-1,4-bonds.

It is known that soluble titanium-iodine compounds can be prepared for example by replacing one iodine atom in titanium tetraiodide by an alkoxy radical (see German Auslegeschrift No. 1,165,864). The reaction products of these alkoxy titanium triiodides with organic aluminum compounds constitute effective catalysts for the preparation of cis-1,4-polybutadiene. The advantage over the catalyst system comprising titanium tetraiodide and aluminum trialkyl is that the titanium alkoxy triiodides, in contrast to titanium tetraiodide, have a good solubility in hydrocarbons.

These titanium alkoxy triiodide solutions can be introduced in the catalyst production in easily determined amounts having an accurately determined content of alkoxy titanium triiodides. The catalyst may thus be produced in a conveniently reproducible manner, which makes it possible to use them in industrial scale polymerization.

Object of the present invention is an improved process for producing a catalyst, suitable for polymerising butadiene to yield 1,4-cis-polybutadiene.

This process is carried out by reacting aluminum alkyls, i.e., aluminum trialkyl, aluminum dialkyl hydrides and aluminum monoalkylhydrides, the alkyl groups of which contain 1 to 20 carbon atoms in the absence of oxygen and moisture at a temperature between −10 and +50° C. with a reaction product of titanium tetraiodide and a 1,2-epoxide. This reaction product is produced from 0.5 to 1.5 mols of 1,2-epoxide per 1 mol of titanium tetraiodide. Part of the titanium iodine compound formed may be replaced by titanium tetrachloride or titanium tetrabromide in the process for producing the catalyst. If titanium tetrachloride or titanium tetrabromide is used its molar ratio as compared to the titanium tetraiodide/1,2-epoxide reaction product is preferably 0.05:1 to 1.5:1.

The molar ratio of the titanium component and the organic aluminum compound of the catalyst systems prepared according to the invention is 1:2 to 1:20. Aluminum trialkyls, as well as monoalkyl and dialkyl aluminum hydrides, can be used as organic aluminum compounds.

The following are mentioned as aluminum compounds suitable for the preparation of the catalysts according to the invention: $Al(C_2H_5)_3$, $Al(n-C_3H_7)_3$, $Al(i-C_4H_9)_3$, $Al(n-C_{12}H_{25})_3$, $Al(i-C_4H_9)H_2$ and $Al(i-C_4H_9)_2H$.

The reaction of titanium teraiodide with the 1,2-epoxides is effected in the absence of oxygen in anhydrous aromatic or aliphatic solvents which do not contain any easily replaceable hydrogen atoms, more especially in hydrocarbons (such as benzene, toluene, cyclohexane, pentane, or hexane) and also in halogenated hydrocarbons, such as chlorobenzene and tetra-chlorethylene. The titanium tetraiodide advantageously is initially supplied in comminuted form in the solvent, and the epoxide is added while stirring. The reaction of titanium tetraiodide with epoxides takes place with evolution of heat, so that the reaction solution sometimes has to be cooled when working with relatively large batches. The process is generally carried out at reaction temperatures between 10 and 120° C. Depending on the temperature which is chosen within this range, the reaction period is between a few minutes and 2 hours. The reaction is ended when the titanium tetraiodide has dissolved.

The degree of conversion can be determined by the decrease in the amount of ionically bonded iodine (i.e. iodide) during the reaction, as for each mole of reacted 1,2-epoxide one mole of iodine will be transferred from the ionic state (bonded to titanium in form of iodide) to the non-ionic state (bonded to carbon).

This will become more evident from the following reaction scheme:

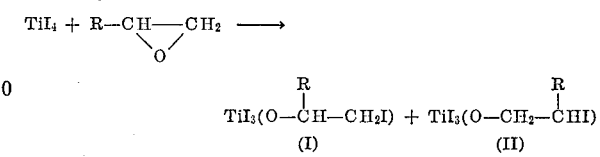

The compound of type I being the main product.

As epoxides, ethylene oxide but more especially substitution products of ethylene oxide, such as propylene oxide, epichlorohydrin, styrene oxide, butadiene oxide and cyclohexene oxide, are considered. Which epoxides may be used in the process according to the invention is primarily determined by the fact that, in the reaction with titanium tetraiodide, products must be formed which are sufficiently soluble in the solvent used for the preparation of the catalyst or for the polymerization. One particularly suitable epoxide is epichlorohydrin.

The reaction products of titanium tetraiodide with epoxides are used in the form of their solutions when preparing the catalyst.

The preparation of the mixed catalysts for polymerizing butadiene is effected in aliphatic and/or aromatic hydrocarbons or halogenated hydrocarbons in the absence of oxygen and moisture at temperatures from −10 to 50° C., by reacting the reaction products of titanium tetraiodide and 1,2-epoxides with organic aluminum compounds, the sequence of the addition not being critical. If the reaction products of titanium tetraiodide and 1,2-epoxides are replaced by their mixtures with titanium tetrachloride or titanium tetrabromide, the addition of the titanium tetrahalide can follow the reaction of titanium tetraiodide with the 1,2-epoxides or, when preparing the actual catalyst, addition of the titanium tetrahalide can take place before or after adding the organic aluminum compounds.

Butadiene is polymerized with the aid of the catalysts according to the invention by processes which are known per se at temperatures from −40 to 80° C. in the solvents used for the preparation of the catalyst.

The catalysts are used in such quantities that 0.2 to 2.0 mmols. of titanium compounds are present for 100 g. of butadiene.

The deactivation of the catalysts after the polymerization and also the isolation of the polymers may if desired be effected by adding organic acids, alcohols or bases, as well as the usual stabilizers, and by precipitation with for example alcohols or acetone, or by driving off the solvent in vacuo or with steam.

Because of the good solubility of the reaction products of titanium tetraiodide and epoxides, they are excellently suitable for the preparation of titanium iodide catalysts for the polymerization of butadiene. When using the titanium compounds prepared according to the invention, a disturbance-free use of catalysts of the titanium iodide type on an industrial scale is guaranteed. The catalysts according to the invention show a considerably improved catalyst activity by comparison with the catalyst system comprising titanium alkoxy triiodide and aluminum trialkyl. For the preparation of a cis-1,4-polybutadiene having a specific molecular weight, for example in the industrially interesting molecular weight range with a Mooney viscosity between 40 and 45, smaller molar quantities of titanium and aluminum are required than when using the catalysts according to the invention than is the case with the titanium alkoxy triiodide catalysts. Having regard to the cost of aluminum alkyls and iodine, the saving of catalyst is of exceptional interest when preparing cis-1,4-polybutadiene on the grounds of industrial economy.

The catalysts according to the invention produce excellent volume/time yields of butadiene polymers, which have a content of more than 80% of cis-1,4-bonds. The butadiene polymers can be used mainly in the tire industry in connection with the manufacture of tire treads.

Example 1

(a) *Reaction of titanium tetraiodide with propylene oxide.*—In the absence of moisture and in a nitrogen atmosphere, 250 ml. of dry cyclohexane were poured over 11.1 g. of titanium tetraiodide. The grain size of the titanium tetraiodide was 1 to 5 mm. While stirring, 1.16 g. of propylene oxide (distilled over KOH), dissolved in 10 ml. of cyclohexane, were then added. The temperature of the reaction solution rose slightly and the titanium tetraiodide started to dissolve. The reaction was terminated by heating for 2 hours to 70° C. The cooled solution was filtered, only a small quantity of a finely divided deposit being left. On decomposing a part of the solution with water and determining the iodide content with silver nitrate, it was found that, an iodide equivalent of the quantity of titanium tetraiodide introduced could no longer be titrated.

(b) *Preparation of catalyst and polymerization.*—With exclusion of moisture and in a nitrogen atmosphere, 2000 ml. of dry toluene (water content below 10 p.p.m.) were mixed with 0.952 g. of aluminum triisobutyl in a stirrer-type vessel. 15.6 ml. of the titanium solution as prepared under (a) and containing 1.2 mmols. of titanium were thereafter added at room temperature. 200 g. of butadiene (water content below 20 p.p.m.) were introduced into the dark brown catalyst solution. The polymerization started immediately and the temperature was temporarily lowered by external cooling when the temperature exceeded 40° C. After 3 hours the polymerization of the mixture was stopped by mixing in 4 g. of resinic acid and and 1 g. of 2,6-di-tert.-butyl-4-methylphenol, dissolved in 20 ml. of methanol. The solvent was driven off by introducing the polymer solution into hot water while stirring. The polymer crumbs, after being dried at 60° C. in vacuo, showed a yield of 96% of a polybutadiene having the following properties:

Content of cis-1,4 bonds: 88.3%.
Mooney viscosity (ML—4, 100 C.): 37.

(c) under the same conditions, a catalyst solution was prepared from 1.2 mmols. of butoxytitanium triiodide and 0.952 g. of aluminum triisobutyl, into which 200 g. of butadiene were introduced. At the same temperatures, there was obtained a yield of 94% of a polybutadiene with the following properties:

Cic-1,4 bonds: 89.5%.
Mooney viscosity: 55.

With the same titanium concentration and the same titanium/aluminum ratio, the catalyst prepared according to 1(b) showed a higher catalyst efficacy, the molecular weight of the polymer which is obtained being lower.

Example 2

(a) Under the conditions of Example 1(a), 11.1 g. of titanium tetraiodide and 1.4 g. of vinyl ethylene oxide (butadiene monoxide) were reacted in the same quantity of cyclohexane. The solution obtained contained only very small quantities of an insoluble deposit. Corresponding to Example 1(b), a catalyst solution was prepared with the use of 1.2 mmols. of titanium in the form of the solution as obtained and 0.95 g. of aluminum triisobutyl. The resulting polybutadiene (yield 95%) had a cis content of 87.0% and a Mooney viscosity of 30.

(b) As in Example 1(b), a catalyst solution was prepared using aluminum triethyl, 6.5 ml. of the solution of the reaction product of titanium tetraiodide and butadiene monoxide (corresponding to 0.5 mmols. of titanium) being added together with 0.095 g. of titanium tetrachloride to the solution of aluminum triethyl in toluene. With the aid of this catalyst solution, 188 g. of polybutadiene were obtained from 200 g. of butadiene at temperatures between 20 and 35° C. within a period of 3 hours, the said polybutadiene being worked up as in Example 1(b).

The cis content was 83.5% and the Mooney viscosity 32.

Example 3

As in Example 1(a), but using the same quantity of toluene, 11.1 g. of titanium tetraiodide were reacted with 1.96 g. of cyclohexene oxide. The reaction mixture was stirred for 1 hour at 80° C. and filtered after cooling. 12.7 ml. of this solution contained 1 mmol of titanium. 0.95 g. of aluminum triisobutyl in 1.8 liters of toluene were reacted with 15.2 ml. of the above solution at 20° C. while stirring. 200 g. of butadiene were introduced at once into this catalyst solution. After working up as in Example 1(b), 185 g. of polybutadiene were obtained, having a cis content of 84.8% and a Mooney viscosity of 38.

Example 4

(a) *Reaction of titanium tetraiodide with epichlorhydrin.*—130 ml. of dry toluene were added to 11.1 g. of titanium tetraiodide (grain size 1–2 mm.) in the absence of moisture and in a nitrogen atmosphere. While stirring, 1.85 g. of epichlorhydrin were slowly added dropwise, whereupon the temperature of the reaction solution rose slightly. This was then heated for 2 hours to 80° C. The solution was filtered, only an extremely small quantity of deposit being left behind. The titanium content of the solution was 1 mmol of titanium in 6.65 ml. of solution.

(b) *Preparation of catalyst and polymerization.*—12 liters of dry toluene were mixed with 4.2 g. of aluminum triisobutyl in a stirrer-type autoclave, with exclusion of moisture and after displacement of the air by ultra-pure nitrogen. 35.2 ml. of the above titanium solution were added at 20° C. while stirring. The solution was stirred for 5 minutes and thereafter 1000 g. of butadiene were introduced. Polymerization started immediately. The temperature was kept between 20 and 30° C. After 2 hours, working up was carried out as in Example 1(b). 950 g. of polybutadiene with a Mooney viscosity of 45 were obtained. The cis content was 86.8%.

(c) Under the same conditions as under (b), a catalyst solution of butoxytitanium triiodide and aluminum triisobutyl was prepared, the molar ratio between titanium and aluminum likewise being 1:4. In order to prepare a polymer with a Mooney viscosity of 45, it was necessary to use a titanium concentration of 0.62 mmol to 100 g. of butadiene. By comparison with the catalyst prepared under (b), the catalyst consumption was 20% higher, related to the molar quantity.

Example 5

A catalyst solution was prepared as in Example 1(b) in two liters of toluene, 0.396 g. of aluminum triisobutyl and 3.33 ml. of titanium solution from Example 4(a), which previously had been admixed with 0.095 g. of titanium tetrachloride, being added to the solvent in the above sequence. From 200 g. of butadiene, there were obtained 188 g. of polymer having a Mooney viscosity of 38 and a cis content of 84.9%.

We claim:

1. In a process for preparing hydrocarbon-soluble mixed catalysts for polymerizing butadiene by reacting aluminum alkyl selected from the group consisting of aluminum trialkyl, aluminum dialkyl hydrides and aluminum alkyl hydrides with titanium-iodine compounds in the absence of oxygen and moisture at temperatures of between −10 and +50° C., the improvement which comprises reacting said aluminum alkyl with the reaction products of titanium tetraiodide and 1,2-epoxides produced in an organic solvent, the molar ratio of titanium tetraiodide and 1,2-epoxides being 1:0.5 to 1:1.5.

2. A process according to claim 1, wherein said 1,2-epoxide is epichlorohydrin.

3. A process according to claim 1, wherein the molar ratio between titanium-iodine compound and aluminum alkyl is between 1:1 and 1:20.

4. A process according to claim 1, wherein the reaction products of titanium tetraiodide and 1,2-epoxides are mixed with titanium tetrachloride or with titanium tetrabromide, the ratio between titanium-iodine compound and titanium tetrachloride or titanium tetrabromide being 1:0.05 to 1:1.5.

5. A process according to claim 1, wherein the reaction of titanium tetraiodide with 1,2-epoxide in solvents is effected at temperatures from 10 to 120° C.

6. A process according to claim 1, wherein said organic solvent is selected from the group consisting of hydrocarbons and chlorinated hydrocarbons.

7. Butadiene polymerization catalysts comprising a reaction product of an aluminum alkyl selected from the group consisting of aluminum trialkyl, aluminum dialkyl hydrides and aluminum alkyl hydrides and a titanium-iodine compound which is a reaction product of titanium tetraiodide and an 1,2-epoxide in a molar ratio of 1:0.5 to 1:1.5.

8. Butadiene polymerization catalysts comprising a reaction product of an aluminum alkyl selected from the group consisting of aluminum trialkyl, aluminum dialkyl hydrides and aluminum alkyl hydrides and a titanium-iodine compound which is a reaction product of titanium tetraiodide and epichlorohydrine in a molar ratio of 1:0.5 to 1:1.5.

9. In a process for polymerizing butadiene in an organic solvent the improvement which comprises carrying out said polymerization with a catalyst comprising the reaction product of titanium tetraiodide and an 1,2-epoxide in a molar ratio of 1:0.5 to 1:1.5.

10. In a process for polymerizing butadiene in an organic solvent the improvement which comprises carrying out said polymerization with a catalyst comprising the reaction product of titanium tetraiodide and epichlorohydrine in a molar ratio of 1:0.5 to 1:1.5.

11. A novel polymerization catalyst prepared by reacting (a) aluminum triisobutyl with (b) the 1:0.5 to 1:1.5 molar ratio reaction product of titanium tetraiodide with propylene oxide.

12. An improved process for preparing polybutadiene containing a high content of cis-1,4-bonds which comprises contacting butadiene under substantially anhydrous conditions in an organic solvent under an inert atmosphere with a catalyst prepared by reacting (a) aluminum triisobutyl with (b) the 1:0.5 to 1:1.5 molar ratio reaction product of titanium tetraiodide with propylene oxide.

13. A novel polymerization catalyst prepared by reacting (a) aluminum triisobutyl with (b) the 1:0.5 to 1:1.5 molar ratio reaction product of titanium tetraiodide with vinyl ethylene oxide.

14. An improved process for preparing polybutadiene containing a high content of cis-1,4-bonds which comprises contacting butadiene under substantially anhydrous conditions in an organic solvent under an inert atmosphere with a catalyst prepared by reacting (a) aluminum triisobutyl with (b) the 1:0.5 to 1:1.5 molar ratio reaction product of titanium tetraiodide with vinyl ethylene oxide.

15. A novel polymerization catalyst prepared by reacting (a) aluminum triisobutyl with (b) the 1:0.5 to 1:1.5 molar ratio reaction product of titanium tetraiodide with cyclohexane oxide.

16. An improved process for preparing polybutadiene containing a high content of cis-1,4-bonds which comprises contacting butadiene under substantially anhydrous conditions in an organic solvent under an inert atmosphere with a catalyst prepared by reacting (a) aluminum triisobutyl with (b) the 1:0.5 to 1:1.5 molar ratio reaction product of titanium tetraiodide with cyclohexane oxide.

17. A novel polymerization catalyst prepared by reacting (a) aluminum triisobutyl with (b) the 1:0.5 to 1:1.5 molar ratio reaction product of titanium tetraiodide with epichlorohydrin.

18. An improved process for preparing polybutadiene containing a high content of cis-1,4-bonds which comprises contacting butadiene under substantially anhydrous conditions in an organic solvent under an inert atmosphere with a catalyst prepared by reaction (a) aluminum triisobutyl with (b) the 1:0.5 to 1:1.5 molar ratio reaction product of titanium tetraiodide with epichlorohydrin.

References Cited

UNITED STATES PATENTS 3,277,131   10/1966   Schon et al. _____ 260—429.5

JOSEPH L. SCHOFER, Primary Examiner.

R. A. GAITHER, Assistant Examiner.